(12) United States Patent
Xu et al.

(10) Patent No.: US 9,826,236 B2
(45) Date of Patent: Nov. 21, 2017

(54) COEFFICIENT CODING HARMONIZATION IN HEVC

(71) Applicant: SONY CORPORATION, Tokyo (JP)

(72) Inventors: Jun Xu, Sunnyvale, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/792,300

(22) Filed: Jul. 6, 2015

(65) Prior Publication Data

US 2016/0065965 A1 Mar. 3, 2016

Related U.S. Application Data

(63) Continuation of application No. 13/631,464, filed on Sep. 28, 2012, now Pat. No. 9,106,918.

(60) Provisional application No. 61/589,151, filed on Jan. 20, 2012.

(51) Int. Cl.
| | |
|---|---|
| *H04N 19/13* | (2014.01) |
| *H04N 19/60* | (2014.01) |
| *H04N 19/176* | (2014.01) |
| *H04N 19/159* | (2014.01) |
| *H04N 19/129* | (2014.01) |
| *H04N 19/136* | (2014.01) |
| *H04N 19/18* | (2014.01) |

(52) U.S. Cl.
CPC ........... *H04N 19/13* (2014.11); *H04N 19/129* (2014.11); *H04N 19/136* (2014.11); *H04N 19/159* (2014.11); *H04N 19/176* (2014.11); *H04N 19/18* (2014.11); *H04N 19/60* (2014.11)

(58) Field of Classification Search
CPC ....... H04N 19/13; H04N 19/60; H04N 19/176
See application file for complete search history.

(56) References Cited

U.S. PATENT DOCUMENTS

| 9,106,918 | B2 | 8/2015 | Xu et al. |
|---|---|---|---|
| 2010/0086029 | A1 | 4/2010 | Chen et al. |
| 2011/0096834 | A1 | 4/2011 | Cheon et al. |
| 2011/0206135 | A1 | 8/2011 | Drugeon et al. |
| 2012/0082234 | A1 | 4/2012 | Lou |
| 2013/0107969 | A1 | 5/2013 | Nguyen et al. |
| 2013/0128985 | A1* | 5/2013 | He .................. H04N 19/176 375/240.18 |

FOREIGN PATENT DOCUMENTS

| CN | 102197651 A | 9/2011 |
|---|---|---|
| CN | 102598664 A | 7/2012 |

(Continued)

OTHER PUBLICATIONS

Joel Sole, Rajan Joshi, Marta Karczewicz, "Diagonal Sub-block scanning for HE residual codint", Nov. 21-30, 2011, 7th Meeting Geneva, p. 1-4.*

(Continued)

*Primary Examiner* — Nam Pham
(74) *Attorney, Agent, or Firm* — Chip Law Group

(57) ABSTRACT

Coefficient coding for transform units (TUs) during high efficiency video coding (HEVC), and similar standards, toward simplifying design while enhancing efficiency. Elements of the invention include coefficient coding for TUs with up-right diagonal scans being modified, and selectively applying multi-level significance map coding.

6 Claims, 9 Drawing Sheets

(56) References Cited

FOREIGN PATENT DOCUMENTS

| JP | 5843224 B2 | 1/2016 |
|---|---|---|
| JP | 5843225 B2 | 1/2016 |
| WO | 2011142817 A1 | 11/2011 |
| WO | 2012045041 A1 | 4/2012 |

OTHER PUBLICATIONS

European Patent Office (EPO), European Supplemental Search Report (ESSR) issued on Apr. 18, 2013 for corresponding European Patent Application No. EP 13 15 1018, pp. 1-14.

Sole, J. et al. "Non-CE11: Diagonal sub-block scan for HE residual coding," Joint Collaborative Team on Video Coding of ITU-T SG16 WP3 and ISO/IEC JTC1/SC29/WG11, 7th Meeting, Geneva, CH, Nov. 9, 2011, pp. 1-4.

Nbuyen, N. et al. "Multi-level significance maps for Large Transform Units," Joint Collaborative Team on Video Coding of ITU-T SG16 WP3 and ISO/IEC JTC1/SC29/WG11, 7th Meeting, Geneva, CH, Nov. 9, 2011, pp. 1-11.

McCann, K. et al., "HM4: HEVC Test Model 4 Encoder Description," Joint Collaborative Team on Video Coding of ITU-T SG16 WP3 and ISO/IEC JTC1/SC29/WG11, 6th Meeting: Torino, IT, Jul. 22, 2011, pp. 1-36.

Yunfei, Z. et al., "CE11: Mode Dependent Coefficient Scanning," Joint Collaborative Team on Video Coding of ITU-T SG16 WP3 and ISO/IEC JTC1/SC29/WG11, 4th Meeting: Daegu, KR, Jan. 16, 2011, pp. 1-4.

State Intellectual Property Office of the People's Republic of China (SIPO), Notification of the First Office Action, Appln. No. 201310012757.8, Aug. 5, 2015, English-language translation pp. 1-12, Japanese-language office action pp. 13-30, claims examined pp. 31-35.

Sole et al., "Non-CE11: Diagonal sub-block scan for HE residual coding", Joint Collaborative Team on Video Coding of ITU-T SG16 WP3 and ISO/IEC JTC1/SC29/WG11, 7th Meeting: Geneva, CH, Nov. 21, 2011, pp. 1-10.

Wang et al. "A dual quad-tree based variable block-size coding method." Journal of Visual Communication and Image Representation, vol. 21, issue 8, Nov. 2010. pp. 889-899.

United States Patent and Trademark Office (USPTO), International Search Report and Written Opinion (pp. 1-8), issued on Feb. 5, 2013 for corresponding International Patent Application No. PCT/US12/69022, and claims searched (pp. 9-14) pp. 1-14.

European Search Report received for European Patent Application No. 15196836.9, mailed on Mar. 18, 2016, p. 11.

Jun Xu et al., "Harmonization of coefficient coding in HEVC", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, p. 3.

European Extended Search Report received for European Patent Application No. 15196837.7, mailed on Mar. 18, 2016, p. 11.

Office Action for JP Patent Application No. 2015-147905, issued on Nov. 1, 2016, 3 pages.

Office Action for JP Patent Application No. 2016-000240, issued on Nov. 1, 2016, 3 pages.

Notice of Allowance issued in U.S. Appl. No. 15/592,837 dated Jul. 6, 2017.

Notice of Allowance issued in U.S. Appl. No. 15/615,286 dated Jul. 7, 2017.

\* cited by examiner

COEFFICIENT CODING HARMONIZATION IN HEVC

CROSS-REFERENCE TO RELATED APPLICATIONS

This application is a continuation of U.S. patent application Ser. No. 13/631,464 filed on Sep. 28, 2012, incorporated herein by reference in its entirety, which claims the benefit of U.S. provisional patent application Ser. No. 61/589,151 filed on Jan. 20, 2012, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to transform unit (TU) encoding and decoding within high efficiency video coding standards.

2. Description of Related Art

In high efficiency video coding (HEVC), a coding unit (CU) may have variable sizes depending on video content toward achieving a desired coding efficiency. CUs typically include a luminance component, Y, and two chroma components, U and V. The size of U and V components relate to the number of samples, and can be the same or different from that of the Y component, as depends upon the video sampling format. These coding units may be split into smaller blocks for prediction or transform. In particular, each coding unit may be further partitioned into prediction units (PUs) and transform units (TUs). Prediction units (PU) can be thought of similarly to partitions described in other video coding standards, such as the H.264 standard. Transform units (TU) generally refer to a block of residual data to which a transform is applied when generating transform coefficients.

Transform unit (TU) coding within high efficiency video coding (HEVC), requires complex coding steps with significant processing overhead and generally comprise several steps including: mode dependent coefficient scan (MDCS), last non-zero coefficient coding, significance map coding and non-zero coefficient level coding. These components vary at different transform unit (TU) sizes.

Accordingly, a need exists for simplifying the design of HEVC coding. The present invention fulfills that need as well as others, toward improving HEVC coding operations.

BRIEF SUMMARY OF THE INVENTION

Coefficient coding for transform units (TUs) is described which enhances and harmonizes overall operation across 4×4, 8×8, 16×16 and 32×32 TUs. In a first portion, coefficient coding for TUs with up-right diagonal scans is modified, and a second portion applies a multi-level significance map coding. Both of these inventive elements apply to TUs with a size of 4×4 or 8×8.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

During high efficiency video coding (HEVC), in particular HEVC test model HM5.0, coefficient coding consists of several steps which vary at different transform unit (TU) sizes.

To enhance the operation of HEVC coding, a more unified solution to coefficient coding is taught herein that harmonizes coefficient coding, such as for the up-right diagonal scan, so that all TUs with up-right diagonal scan will have the same coefficient coding.

Table 1 and Table 2 compare elements from existing coefficient coding in HEVC test model HM5.0 (Table 1) with changes according to the invention seen in Table 2. The column marked scan is the transform coefficient scanning order, and the Multi-level Sig Map represents how Multi-level significance map coding first encodes a CG flag. It will be noted that in moving from Table 1 to Table 2 that scanning is enhanced in certain instances with 4×4 and 8×8 TU sizes with sub-block up-right diagonal scanning (sub-D), while additional application of multi-level significance mapping is applied.

Figure 1:
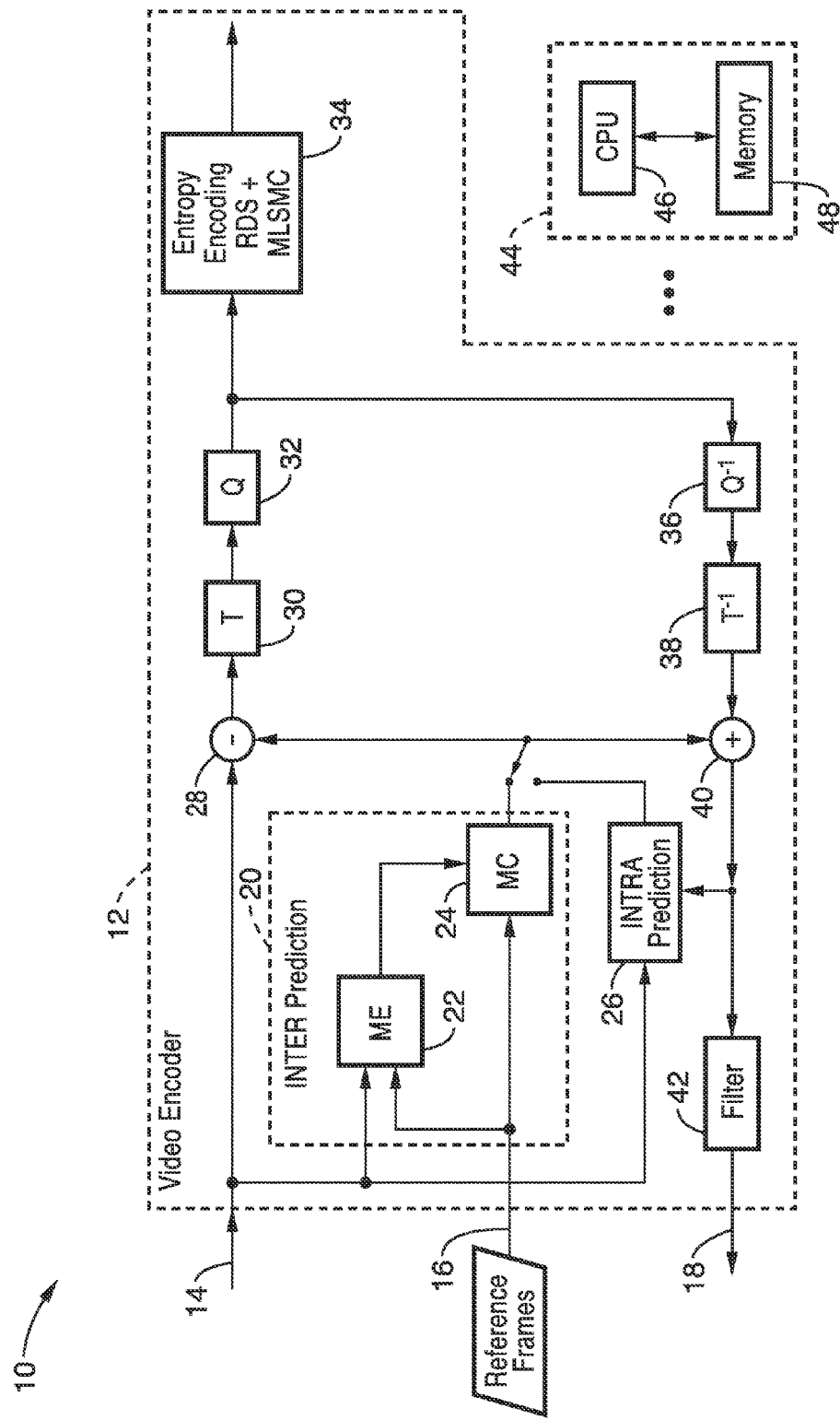
FIG. 1 is a schematic of a video encoder according to an embodiment of the present invention.

FIG. 1 illustrates an example embodiment of a coding apparatus comprising an encoder 10 according to the invention for performing replacement of up-right diagonal scan (RDS), and for applying multi-level significance map coding (MLSMC). The invention is implemented within the entropy encoding block 34, shown containing generalized RDS and MLSMC, but otherwise can rely on conventional video coding which maximizes compatibility with coding systems.

The encoder 10 is shown with encoding elements 12 executed by one or more processors 44. In the example, video frame input 14 is shown along with reference frames 16 and frame output 18. Inter-prediction 20 is depicted with motion estimation (ME) 22 and motion compensation (MC) 24. Intra prediction 26 is shown and switching is depicted between inter prediction and intra prediction. A sum junction 28 is shown with output to a forward transform 30 which is performed based on the predictions to generate transform coefficients of residual data. Quantization of the transform coefficients is performed at quantization stage 32, which is followed by entropy encoding 34. Inverse quantization 36 and inverse transform 38 operations are shown coupled to a summing junction 40 followed by a filter 42, such as a deblocking and/or loop filter and/or sample adaptive offset.

It should be appreciated that the encoder is shown implemented with a processing means 44, such as comprising at least one processing device (e.g., CPU) 46 and at least one memory 48 for executing programming associated with the encoding. In addition, it will be appreciated that elements of the present invention can be implemented as programming stored on a media, which can be accessed for execution by a CPU for the encoder 10 and/or decoder 50.

Figure 2:
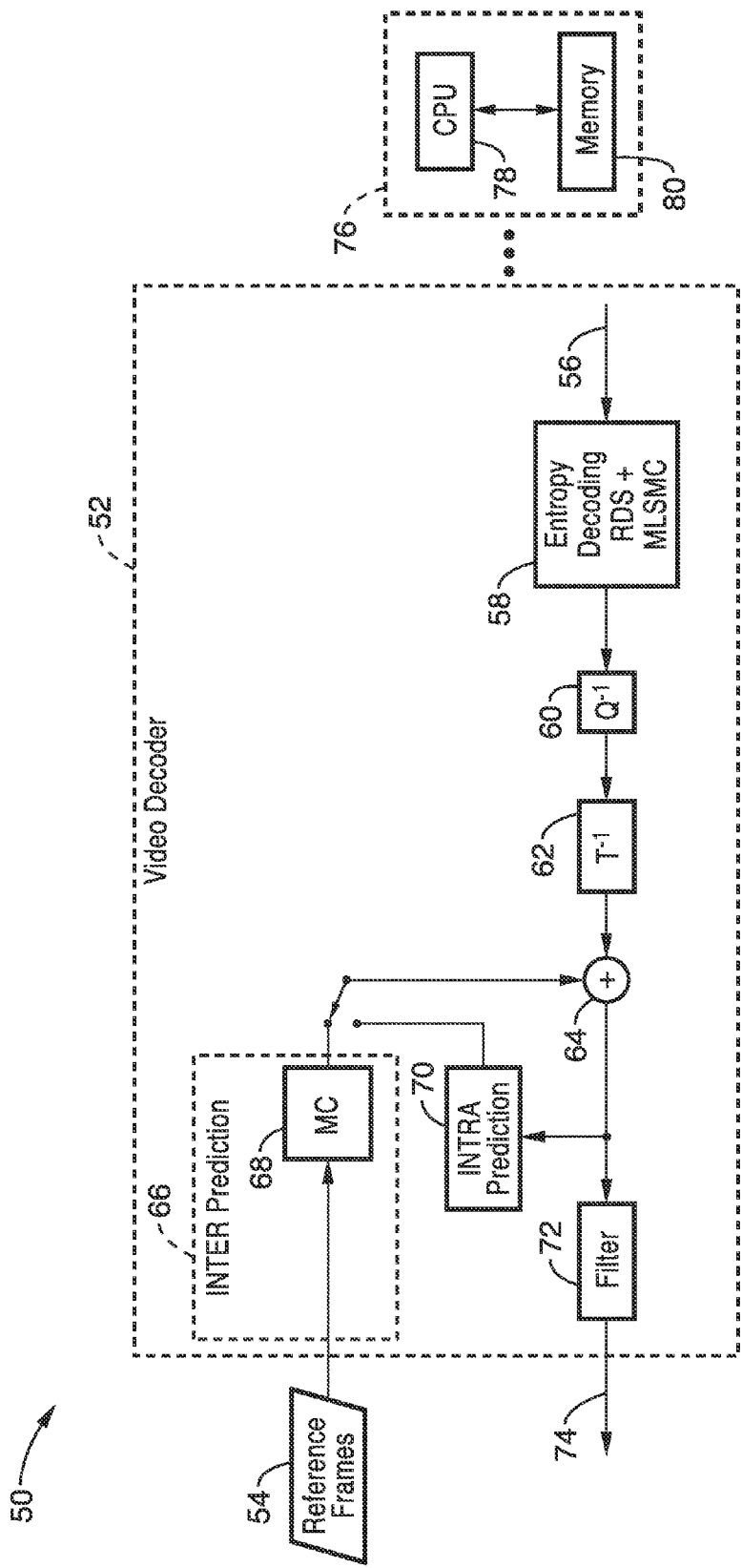
FIG. 2 is a schematic of a video decoder according to an embodiment of the present invention.

FIG. 2 illustrates an example embodiment 50 of a decoder, shown with process blocks 52 and an associated processing means 76. It will be noted that the decoder is substantially a subset of the elements contained in encoder 10 of FIG. 1, operating on reference frames 54 and outputting video 74. The decoder blocks receive an encoded video signal 56 which is processed through entropy decoder 58 which performs decoding of the one dimensional TUs based on the mode dependent scan and decoding of the last non-zero transform position as determined by the encoder. The TUs are processed: (1) during mode dependent coefficient scanning (MDCS) with TUs that are 4×4 or 8×8 horizontal or vertical subject to horizontal or vertical scanning and the remaining TUs, including the up-right diagonal 4×4 and 8×8 TUs subject to 4×4 sub-block up-right diagonal scanning; or (2) using multi-level significance maps for both large TUs, and 4×4 and 8×8 TUs with up-right diagonal scans. During using the multi-level significance maps the programming of the decoder decodes a flag from the encoder which determines if a coefficient group is all zero or not, and selects an individual significance map if the coefficient group has any non-zero coefficients.

Following entropy decoding is inverse quantization 60, inverse transform 62, and summing 64 between the inverse transform 62 output and the selection between inter prediction 66 shown with motion compensation 68, and a separate intra prediction block 70. Output from summing junction 64 is received by filter 72, which can be configured as a loop filter, a deblocking filter, sample adaptive offset or any combination thereof. It should be appreciated that the decoder can be implemented with a processing means 76 which comprises at least one processing device 78 and at least one memory 80 for executing programming associated with the decoding. In addition, it will be noted that elements of the present invention can be implemented as programming stored on a media, wherein said media can be accessed for execution by processing device (CPU) 78.

It will be recognized that elements of the present invention 10 and 50 are implemented for execution by a processing means 44 and 76, such as in response to programming resident in memory 48 and 80 which is executable on computer processor (CPU) 46 and 78. In addition, it will be appreciated that elements of the present invention can be implemented as programming stored on a media, wherein said media can be accessed for execution by CPU 46 and 78.

It should be appreciated that the programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Figure 3:
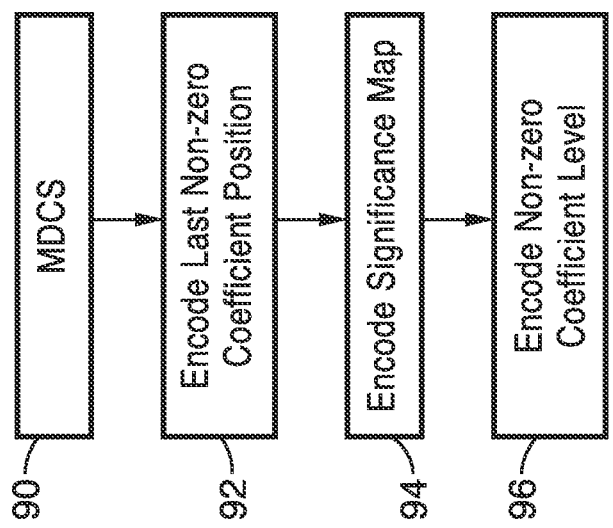
FIG. 3 is a flow diagram of generalized transform unit (TU) encoding steps utilized according to an embodiment of the present invention.

FIG. 3 illustrates general TU coding steps in an encoder which are followed by both conventional TU coding and TU coding according to the present invention. These general steps comprise converting two dimensional (2D) TU into a one dimensional (1D) TU based on a mode dependent coefficient scan (MDCS) 90. The last non-zero coefficient position is identified and encoded 92. A significance map coding 94 encodes whether a coefficient is zero or non-zero. Then the values of non-zero coefficients are encoded 96 to complete the TU coding.

Figure 4:
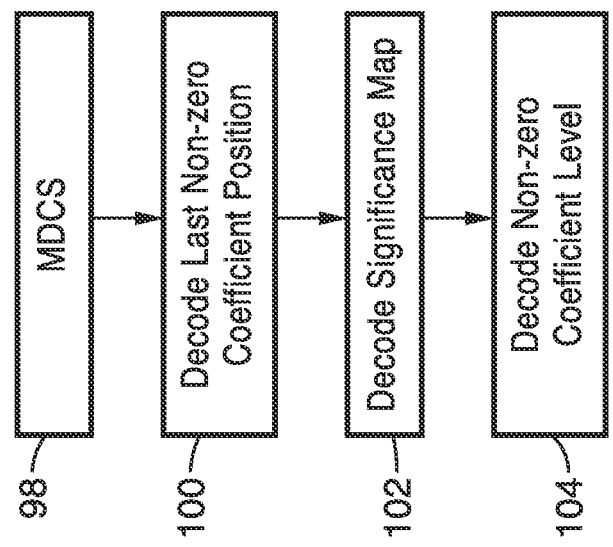
FIG. 4 is a flow diagram of generalized TU decoding steps utilized according to an embodiment of the present invention.

FIG. 4 illustrates general TU coding steps in a decoder which are followed by both conventional TU coding and TU coding according to the present invention. These general steps comprise converting two dimensional (2D) TU into a one dimensional (1D) TU based on a mode dependent coefficient scan (MDCS) 98. The last non-zero coefficient position is decoded 100. A significance map coding 102 decodes whether a coefficient is zero or non-zero. Then the values of non-zero coefficients are decoded 104 to complete the TU coding in the decoder.

Figure 5:
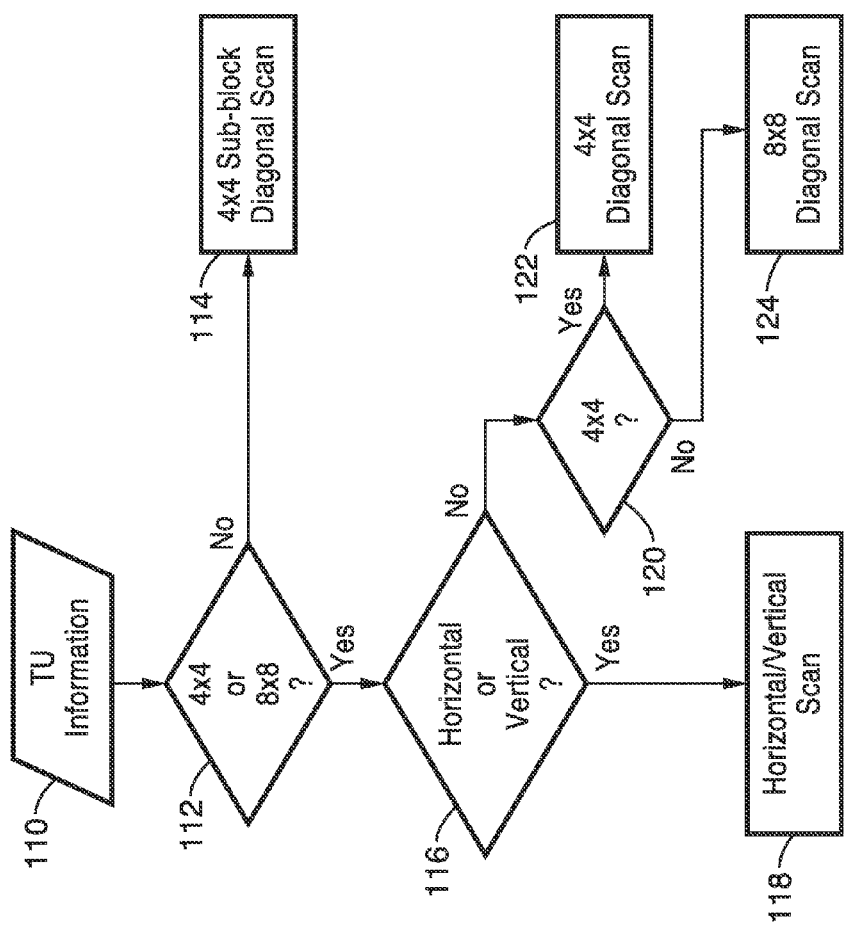
FIG. 5 is a flow diagram of a conventional mode dependent coefficient scan (MDCS).

FIG. 5 depicts a conventional method of performing mode dependent coefficient scan (MDCS). TU information (e.g., size, prediction mode) is received 110 with and large TUs are detected in step 112, with TUs that are not 4×4 or 8×8 being processed with 4×4 sub-block up-right diagonal scanning 114. The 4×4 and 8×8 TUs are checked at step 116, and those that are horizontal or vertical are processed at step 118 using horizontal or vertical scanning. For the 4×4 and 8×8 TUs which are not horizontal or vertical, processing moves from block 116, to block 120 where a check is made to detect 4×4 TUs. The 4×4 TUs are then processed by a 4×4 up-right diagonal scan 122, with 8×8 TUs processed by 8×8 up-right diagonal scanning 124.

Figure 6:
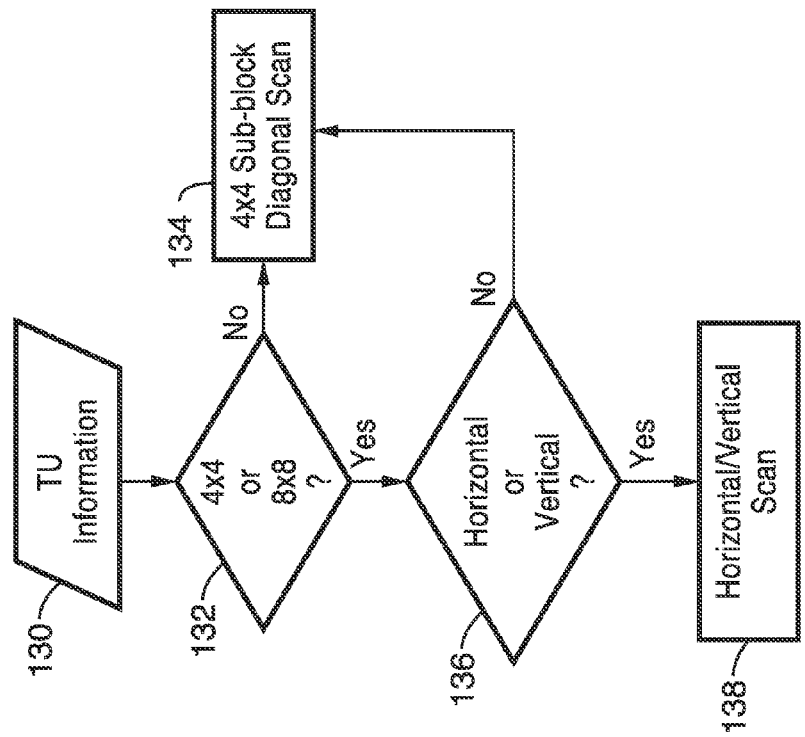
FIG. 6 is a flow diagram of a mode dependent coefficient scan (MDCS) according to an embodiment of the present invention.

FIG. 6 illustrates an example embodiment of mode dependent coefficient scanning (MDCS) according to the invention. TU information is received 130 with large TUs detected in step 132, and TUs that are not 4×4 or 8×8 being processed with 4×4 sub-block up-right diagonal scanning 134. The 4×4 and 8×8 TUs are checked at step 136, and those that are horizontal or vertical are processed at step 138 using horizontal or vertical scanning. For the remaining 4×4 and 8×8 non-horizontal, non-vertical TUs, 4×4 sub-block up-right diagonal scanning is also performed as per block 134.

Figure 7A:
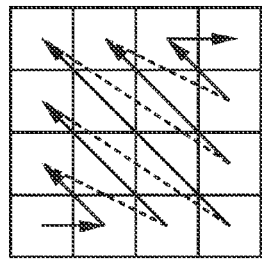
FIG. 7A through 7D are transform unit scanning patterns utilized conventionally, and according to embodiments of the present invention.
Figure 7B:
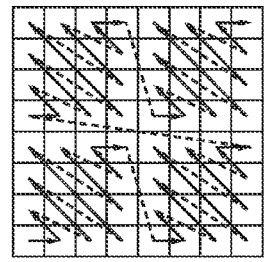
Figure 7C:
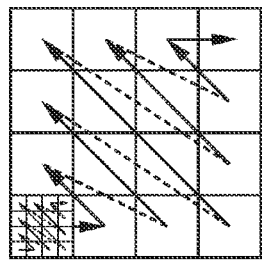
Figure 7D:
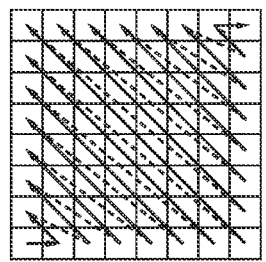

FIG. 7A through FIG. 7D illustrate scanning patterns according to the invention. In FIG. 7A a large TU is seen having 16×16 coefficients, which is subject to sub-block partitioning and up-right diagonal scanning. The figure shows that coefficients are scanned within each 4×4 sub-block, and then scanning moves to the next 4×4 sub-block (i.e., CG). For the sake of simplicity (and space) the scanning pattern within each of the 4×4 sub-blocks is not shown in FIG. 7A. In FIG. 7B an up-right diagonal scan is shown on a 4×4 up-right diagonal TU. It will be noted that 4×4 up-right diagonal scanning is performed on these TUs both before and after the inventive changes seen in FIG. 6. In FIG. 7C is seen a conventional 8×8 up-right diagonal scan, which is replaced according to the invention with 4×4 up-right diagonal sub-block scanning as seen in FIG. 7D. In FIG. 7A through FIG. 7D, MDCS starts from the top-left corner of a TU and traverses through to the bottom-right corner. In the encoding processes 94 and 96 of FIG. 3 and the decoding processes 102 and 104 of FIG. 4, the processing order is the reverse of MDCS shown in FIG. 7A through FIG. 7D.

Figure 8:
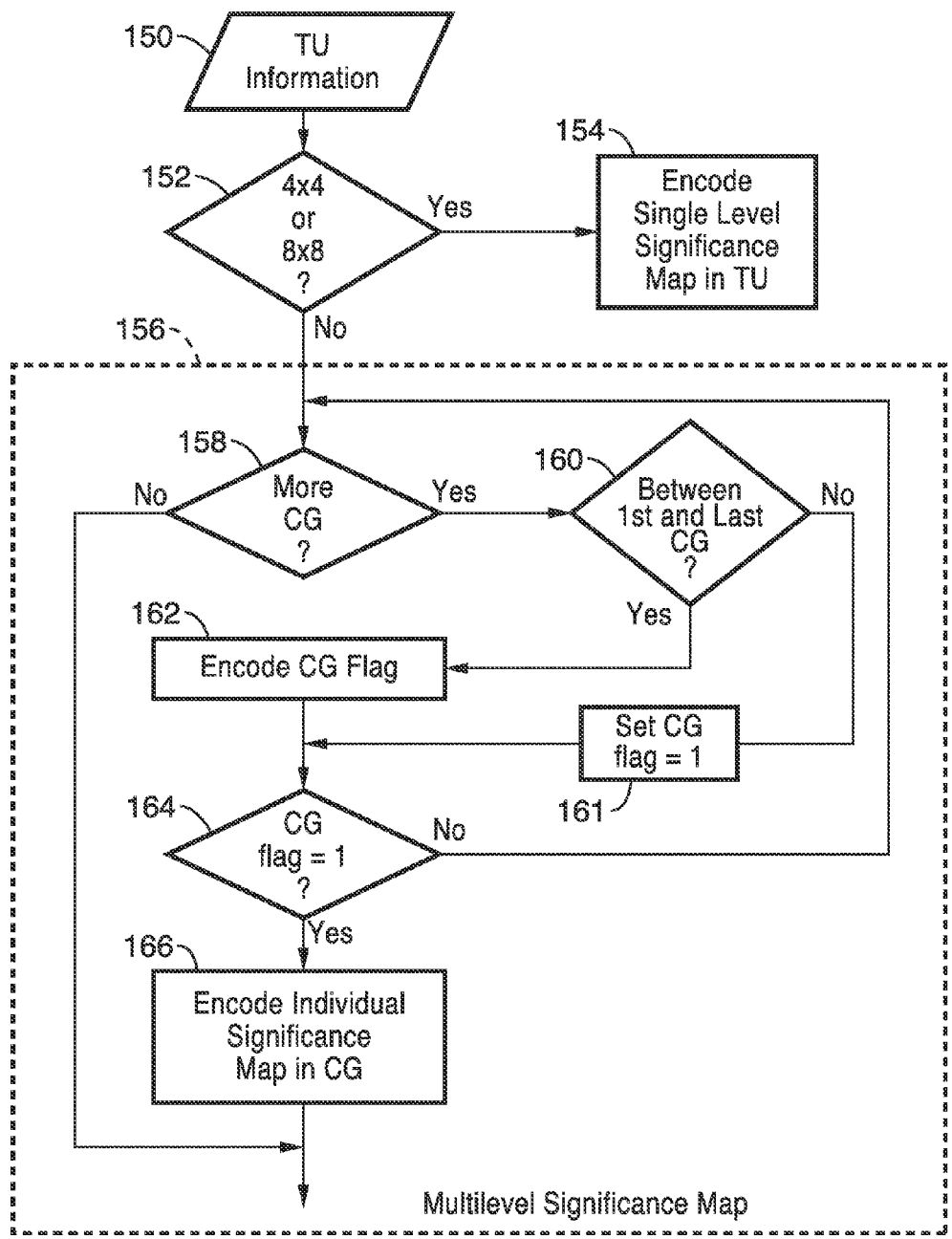
FIG. 8 is a flow diagram of conventional significance map encoding.

FIG. 8 depicts conventional significance map processing in an encoder. TU information 150 is received and for 4×4 and 8×8 TUs, as determined in step 152, a single level significance map encoding 154 is performed. Otherwise, for TUs which are not 4×4 or 8×8, then multi-level significance map encoding 156 is performed. The multi-level significance map encoding is shown comprising checking 158 if there is any more coefficient groups (CG) starting from the last nonzero CG. If no more CG, then multi-level significance map encoding is completed, and execution is seen jumping past step 166. If there are more CG, then a check is made to see if we are between the first and last CGs at step 160. It will be noted that: (1) flagging need not be sent for the all zero CG after the last nonzero CG (the CG containing the last nonzero coefficient), as it can be presumed these will be all zeros and CG flag is set to zero; (2) no flagging is needed the last nonzero CG, as it can be deduced that this has non zero coefficients and CG flag is set to one, and finally (3) flagging is not needed for the first CG, as in almost all cases this CG has nonzero coefficients and CG flag is set to one. Thus, if between the first and last CG as determined in step 160, then (yes) flagging 162 is performed with CG flag encoded. If not between the first and last CGs, then CG flag is set to one 161 and the flagging step is bypassed and execution proceeds to the CG flag check 164. In step 164 it is checked whether the CG flag is equal to one or not, with a return to step 158 if the CG is equal to zero. It will be noted that each 4×4 sub-block comprises a coefficient group (CG). If the CG flag is equal to one, as determined at step 164, then an individual significance map encoding is performed 166.

Figure 9:
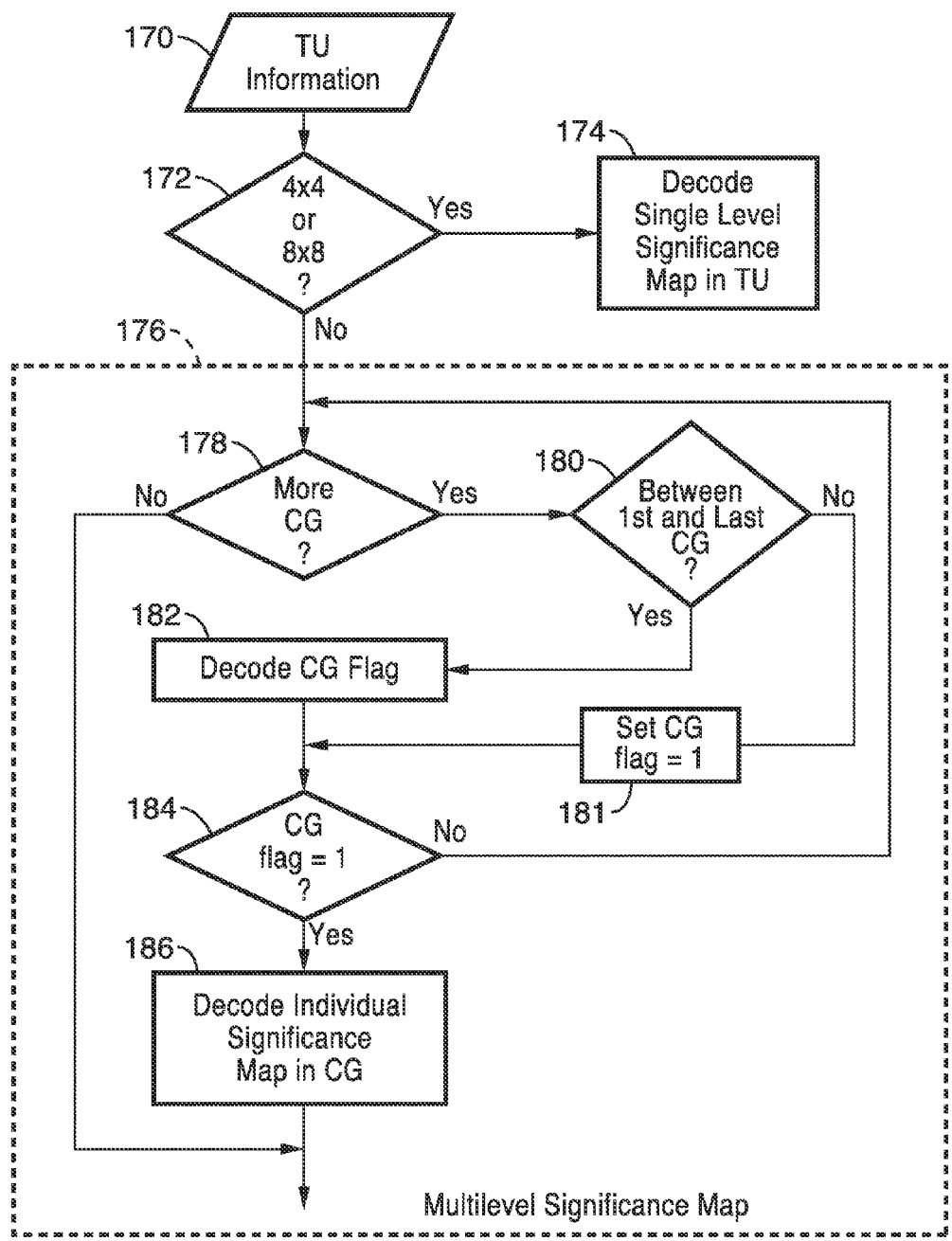
FIG. 9 is a flow diagram of conventional significance map decoding.

FIG. 9 depicts conventional significance map processing in a decoder. TU information 170 is received and for 4×4 and 8×8 TUs, as determined in step 172, a single level significance map decoding 174 is performed. Otherwise, for TUs which are not 4×4 or 8×8, then multi-level significance map decoding 176 is performed. The multi-level significance map decoding is shown comprising checking 178 if there is any more coefficient groups (CG) starting from the last nonzero CG. If no more CG, then multi-level significance map decoding is completed, and execution is seen jumping past step 186. If there are more CG, then a check is made to see if we are between the first and last CGs at step 180. It will be noted that: (1) flagging need not be sent for the all zero CG after the last nonzero CG (the CG containing the last nonzero coefficient), as it can be presumed these will be all zeros and CG flag is set to zero; (2) no flagging is needed the last nonzero CG, as it can be deduced that this has non zero coefficients and CG flag is set to one, and finally (3) flagging is not needed for the first CG, as in almost all cases this CG has nonzero coefficients and CG flag is set to one. Thus, if between the first and last CG as determined in step 180, then (yes) flagging 182 is performed. If not between the first and last CGs, then the CG flag is set to one 181 and the flagging step is bypassed and execution proceeds to the CG flag check 184. In step 184 it is checked whether the CG flag is equal to one or not, with a return to step 178 if the CG is equal to zero. It will be noted that each 4×4 sub-block comprises a coefficient group (CG). If the CG flag is equal to one, as determined at step 184, then an individual significance map decoding is performed 186.

Figure 10:
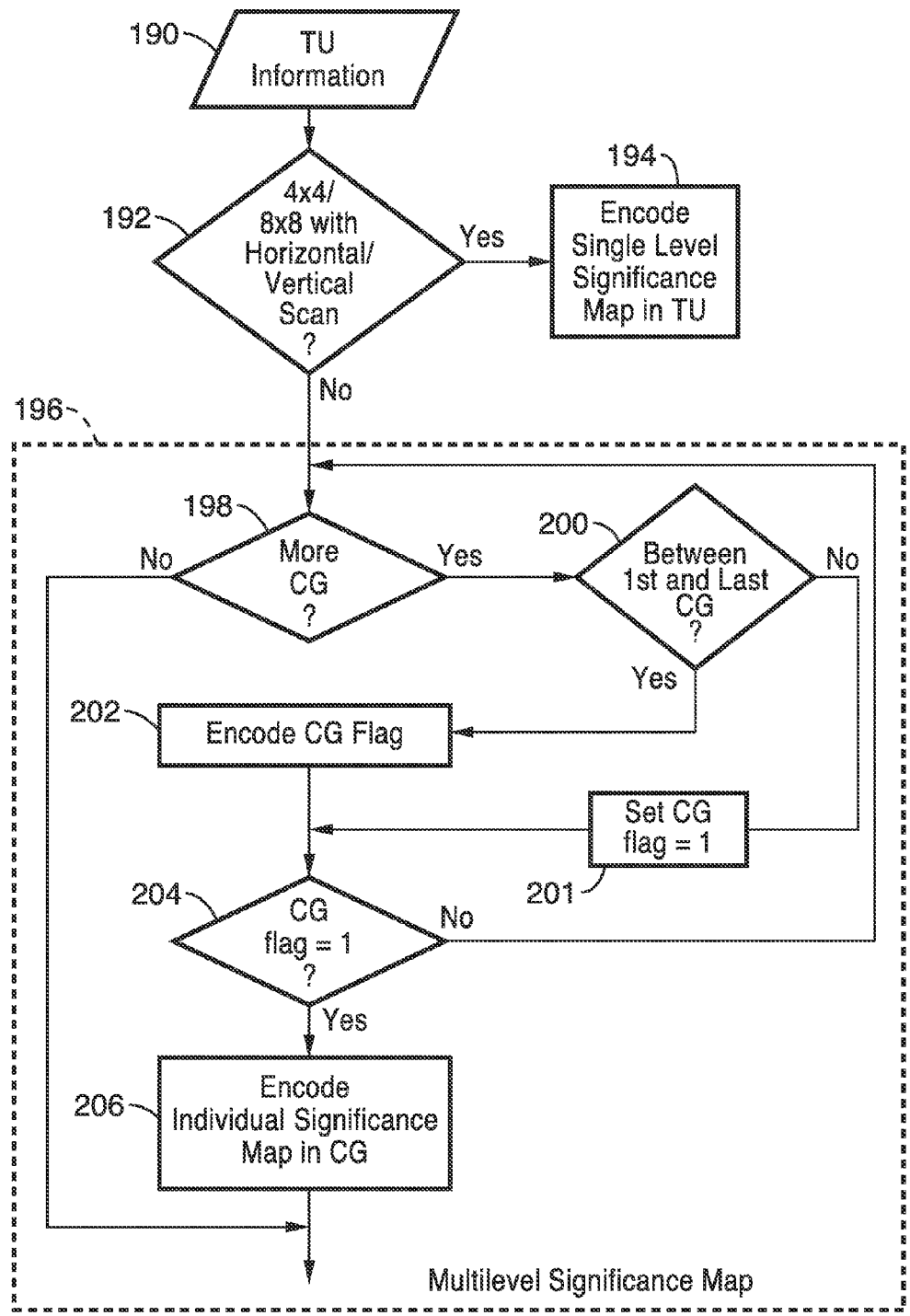
FIG. 10 is a flow diagram of significance map encoding according to an embodiment of the present invention.

FIG. 10 illustrates significance map processing in an encoder according to an element of the present invention. TU information 190 is received and if it is a 4×4 or 8×8 TU with horizontal or vertical scan, as determined in step 192, then a single level significance map encoding 194 is performed. Otherwise, for large TUs, and 4×4 and 8×8 up-right diagonal scan TUs, multi-level significance map encoding 196 is performed. The multi-level significant map encoding is shown comprising checking 198 if there is any more coefficient groups (CG). If no more CG, then multi-level significance map encoding is completed, and execution is seen jumping past step 206. If there are more CG, then a check is made to see if we are between the first and last CGs at step 200. It will be noted that: (1) flagging need not be sent for the all zero CG after the last nonzero CG (the CG containing the last nonzero coefficient), as it can be presumed these will be all zeros and CG flag is set to one; (2) no flagging is needed for the last nonzero CG, as it can be deduced that this has non zero coefficients, and finally (3) flagging is not needed for the first CG, as in almost all cases this CG has nonzero coefficients and CG flag is set to one. Thus, if between the first and last CG as determined in step 200, then (yes) flagging is performed 202. If not between the first and last CGs, then the CG flag is set to one 201 and the flagging step is bypassed with execution advancing to the CG flag check 204. In step 204 it is checked whether CG flag is equal to one or not, with a return to step 198 if the CG is equal to zero. It will be noted that each 4×4 sub-block comprises a coefficient group (CG). If the CG is equal to one, as determined at step 204, then an individual significance map encoding is performed 206.

Figure 11:
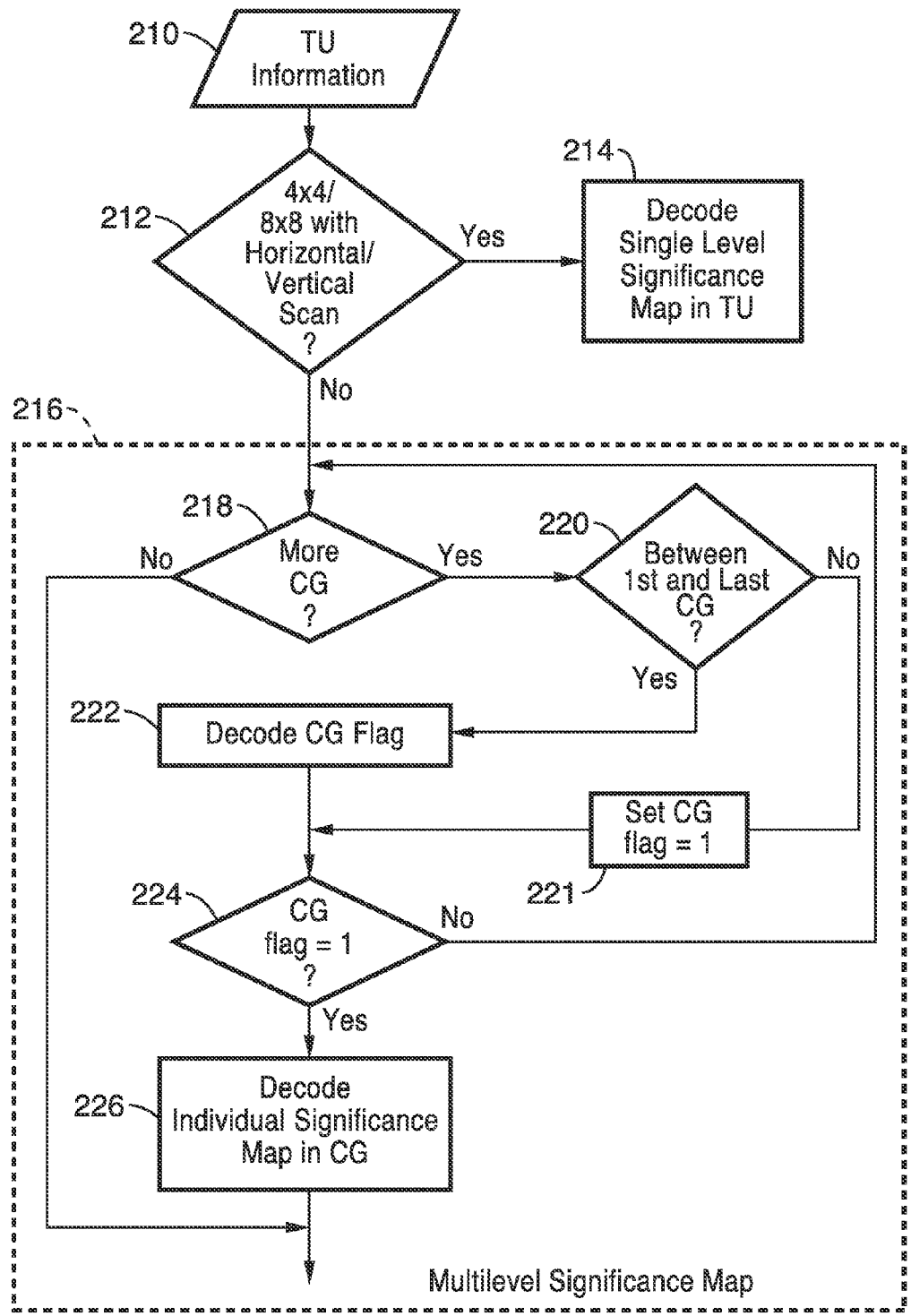
FIG. 11 is a flow diagram of significance map decoding according to an embodiment of the present invention.

FIG. 11 illustrates significance map processing in a decoder according to an element of the present invention. TU information 210 is received and if it is a 4×4 or 8×8 TU with horizontal or vertical scan, as determined in step 212, then a single level significance map decoding 214 is performed. Otherwise, for large TUs, and 4×4 and 8×8 up-right diagonal scan TUs, multi-level significance map decoding 216 is performed. The multi-level significant map decoding is shown comprising checking 218 if there is any more coefficient groups (CG). If no more CG, then multi-level significance map decoding is completed, and execution is seen jumping past step 226. If there are more CG, then a check is made to see if we are between the first and last CGs at step 220. It will be noted that: (1) flagging need not be sent for the all zero CG after the last nonzero CG (the CG containing the last nonzero coefficient), as it can be presumed these will be all zeros and CG flag is set to one; (2) no flagging is needed for the last nonzero CG, as it can be deduced that this has non zero coefficients, and finally (3) flagging is not needed for the first CG, as in almost all cases this CG has nonzero coefficients and CG flag is set to one. Thus, if between the first and last CG as determined in step 220, then (yes) flagging is performed 222 with CG flag encoded. If not between the first and last CGs, then the CG flag is set to one 221 with the flagging step bypassed and execution proceeding to the CG flag check 224. In step 224 it is checked whether CG flag is equal to one or not, with a return to step 218 if the CG is equal to zero. It will be noted that each 4×4 sub-block comprises a coefficient group (CG). If the CG is equal to one, as determined at step 224, then an individual significance map decoding is performed 226.

The following summarizes moving from FIG. 8 (encoder) and FIG. 9 (decoder) to the inventive teachings of FIG. 10 (encoder) and FIG. 11 (decoder). In the existing significance mapping, all 4×4 and 8×8 TUs are subject to single level significance mapping, while only larger TUs (16×16 and 32×32) are processed by multi-level significance mapping. However, as seen in FIGS. 10 and 11, 4×4 and 8×8 TUs with horizontal or vertical scans are processed with a single level significance map, while 4×4 and 8×8 TUs with up-right diagonal scans along with the large TUs (16×16 and 32×32) are processed using the multi-level significance mapping.

These solutions are summarized in the characteristics of Table 2. It can be seen in the table that certain 4×4 and 8×8 TUs are processed differently than before with sub-block up-right diagonal (Sub-D) scanning. The inventive technique was implemented into HEVC HM5.0, with a simulation conducted under common test conditions.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. A system of encoding and decoding of video signals, comprising: (a) a video encoder having a computer processor configured for encoding of video frames; and (b) programming executable on said computer processor for: (i) performing intra-prediction on said video frames based on neighboring reconstructed values, and/or inter-prediction on said video frames based on motion-estimation and motion-compensation; (ii) executing a transform based on said inter-prediction followed by quantization of transform coefficients, and/or executing inverse quantization followed by an inverse transform which is summed with said inter-prediction, on said video frames; and (iii) performing entropy encoding on said video frames comprising: (A) converting two dimensional transform units (TUs) into one dimensional TUs based on a mode dependent coefficient scan (MDCS); (B) identifying and encoding a last non-zero transform coefficient position; (C) generating a significance map encoding whether a coefficient is zero or non-zero; (D) wherein said TUs are processed either: (1) during mode dependent coefficient scanning (MDCS) with TUs that are 4×4 or 8×8 horizontal or vertical subject to horizontal or vertical scanning and the remaining TUs, including the up-right diagonal 4×4 and 8×8 TUs subject to 4×4 sub-block up-right diagonal scanning; or (2) during generating significance map both large TUs, and 4×4 and 8×8 TUs with 4×4 sub-block up-right diagonal scans, are processed with multi-level significance map encoding; (E) encoding remaining non-zero transform coefficients; (c) a decoder having a computer processor configured for decoding video frames; and (d) programming executable on said computer processor for performing entropy decoding upon receiving encoded video frames comprising replacement of up-right diagonal scan (RDS), and/or applying multi-level significance map coding during decoding of transform units (TUs).

2. The system of any of the previous embodiments, wherein said 4×4 sub-block is a coefficient group (CG).

3. The system of any of the previous embodiments, wherein during said multi-level significance mapping said programming is configured for execution on said computer for encoding a flag indicating if a coefficient group is all zero or not, and generating an individual significance map if the coefficient group has any non-zero coefficients.

4. The system of any of the previous embodiments, wherein said encoder coding units (CUs) have variable sizes depending on video content toward achieving a desired coding efficiency, with said CUs split into smaller prediction units (PUs) and transform units (TUs).

5. The system of any of the previous embodiments, wherein said transform units (TU) refer to a block of residual data to which said transform is applied that generates transform coefficients.

6. The system of any of the previous embodiments, wherein said video coding system operates with High Efficiency Video Coding (HEVC) coders.

7. The system of any of the previous embodiments, wherein said programming is configured to utilize the same coefficient coding for all TUs with up-right diagonal scans.

8. An apparatus for entropy encoding within a video coding device, comprising: (a) an encoder having a computer processor configured for encoding video frames; (b) programming executable on said computer processor for: (i) performing inter-prediction on said video frames based on motion-estimation and motion-compensation; (ii) executing a transform based on said inter-prediction followed by quantization of transform coefficients from said transform; and (iii) performing entropy encoding on said video frames comprising: (A) converting two dimensional transform units (TUs) into one dimensional TUs based on a mode dependent coefficient scan (MDCS); (B) identifying and encoding a last non-zero transform coefficient position; (C) generating a significance map encoding whether a coefficient is zero or non-zero; (D) wherein said TUs are processed either: (1) during mode dependent coefficient scanning (MDCS) with TUs that are 4×4 or 8×8 horizontal or vertical subject to horizontal or vertical scanning and the remaining TUs, including the up-right diagonal 4×4 and 8×8 TUs subject to 4×4 sub-block up-right diagonal scanning; or (2) during generating significance mapping both large TUs, and 4×4 and 8×8 TUs with 4×4 sub-block up-right diagonal scans, are processed with multi-level significance map encoding; and (E) encoding remaining non-zero transform coefficients.

9. The apparatus of any of the previous embodiments, wherein said 4×4 sub-block is a coefficient group (CG).

10. The apparatus of any of the previous embodiments, wherein during said multi-level significance mapping said programming is configured for execution on said computer for encoding a flag indicating if a coefficient group is all zero or not, and generating an individual significance map if the coefficient group has any non-zero coefficients.

11. The apparatus of any of the previous embodiments, wherein coding units (CUs) of said encoder have variable sizes depending on video content toward achieving a desired coding efficiency, with said CUs split into smaller prediction units (PUs) and transform units (TUs).

12. The apparatus of any of the previous embodiments, wherein said transform units (TUs) refer to a block of residual data to which said transform is applied that generates transform coefficients.

13. The apparatus of any of the previous embodiments, wherein said video coding apparatus operates with High Efficiency Video Coding (HEVC) coders.

14. The apparatus of any of the previous embodiments, wherein said programming is configured to use the same coefficient coding for all TUs with up-right diagonal scans.

15. An apparatus for entropy decoding within a video decoding device, comprising: (a) a decoder having a computer processor configured for decoding video frames; (b) programming executable on said computer processor for performing entropy decoding upon receiving encoded video frames comprising: (i) converting two dimensional transform units (TUs) into one dimensional TUs based on a mode dependent coefficient scan (MDCS); (ii) decoding a last non-zero transform coefficient position; (iii) decoding a significance map from the encoder as to whether a coefficient is zero or non-zero; (iv) wherein said TUs are processed either: (1) during mode dependent coefficient scanning (MDCS) with TUs that are 4×4 or 8×8 horizontal or vertical subject to horizontal or vertical scanning and the remaining TUs, including the up-right diagonal 4×4 and 8×8 TUs subject to 4×4 sub-block up-right diagonal scanning; or (2) using multi-level significance map decoding for both large TUs, and 4×4 and 8×8 TUs with 4×4 sub-block up-right diagonal scans; and (v) decoding remaining non-zero transform coefficients.

16. The apparatus of any of the previous embodiments, wherein said 4×4 sub-block is a coefficient group (CG).

17. The apparatus of any of the previous embodiments, wherein during utilizing said multi-level significance maps said programming is configured for decoding a flag from an encoder which determines if a coefficient group is all zero or not, and selecting an individual significance map if the coefficient group has any non-zero coefficients.

18. The apparatus of any of the previous embodiments, wherein coding units (CUs) of said decoder have variable sizes depending on video content toward achieving a desired coding efficiency, with said CUs split into smaller prediction units (PUs) and transform units (TUs).

19. The apparatus of any of the previous embodiments, wherein said transform units (TUs) refer to a block of residual data to which an inverse-transform is applied.

20. The apparatus of any of the previous embodiments, wherein said video decoding apparatus operates with High Efficiency Video Coding (HEVC) coders.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Existing Coefficient coding in HEVC Test Model HM5.0

| TU sizes | Scan | Multi-level Sig Map |
|---|---|---|
| 4 × 4 | H/V/D | N/A |
| 8 × 8 | H/V/D | N/A |

TABLE 1-continued

Existing Coefficient coding in HEVC Test Model HM5.0

| TU sizes | Scan | Multi-level Sig Map |
|---|---|---|
| 16 × 16/16 × 4/4 × 16 32 × 32/32 × 8/8 × 32 | Sub-D | applied |

Scan: H = horizontal scan; V = vertical scan; D = up-right diagonal scan varying based on TU size; sub-D = 4 × 4 sub-block up-right diagonal scan.

TABLE 2

Inventive Coefficient coding for HEVC

| TU sizes | Scan | Multi-level Sig Map |
|---|---|---|
| 4 × 4 | H/V | N/A |
| 8 × 8 | H/V | N/A |
| 4 × 4 | Sub-D | applied |
| 8 × 8 | Sub-D | applied |
| 16 × 16/16 × 4/4 × 16 32 × 32/32 × 8/8 × 32 | Sub-D | applied |

Scan: H = horizontal scan; V = vertical scan; D = up-right diagonal scan varying based on TU size; sub-D = 4 × 4 sub-block up-right diagonal scan.

What is claimed is:

1. A coding apparatus, comprising:
one or more processors configured to:
execute, as a condition that diagonal scan is applied to a 4×4 transform block, diagonal scan consisting of diagonal scan of one 4×4 sub-block of the 4×4 transform block, and apply multi-level significance map encoding to the 4×4 transform block; and
execute, as a condition that diagonal scan is applied to an 8×8 transform block, diagonal scan consisting of diagonal scan of four 4×4 sub-blocks and diagonal scan within each of the 4×4 sub-blocks of the 8×8 transform block, and apply the same multi-level significance map encoding to the 4×4 sub-blocks of the 8×8 transform block.

2. The coding apparatus recited in claim 1, wherein the one or more processors are further configured to execute, as a condition that diagonal scan is applied to a 16×16 transform block, the diagonal scan consisting of diagonal scan of sixteen 4×4 sub-blocks and diagonal scan within each of the 4×4 sub-blocks of the 16×16 transform block to apply the same multi-level significance map encoding to the 4×4 sub-blocks of the 16×16 transform block.

3. The coding apparatus recited in claim 1, wherein the one or more processors are further configured to execute, as a condition that diagonal scan is applied to a 32×32 transform block, the diagonal scan consisting of diagonal scan of sixty four 4×4 sub-blocks and diagonal scan within each of the 4×4 sub-blocks of the 32×32 transform block to apply the same multi-level significance map encoding to the 4×4 sub-blocks of the 32×32 transform block.

4. A method, comprising:
in a coding apparatus:
executing, as a condition that diagonal scan is applied to a 4×4 transform block, diagonal scan consisting of diagonal scan of one 4×4 sub-block of the 4×4 transform block, and applying multi-level significance map encoding to the 4×4 transform block; and
executing, as a condition that diagonal scan is applied to an 8×8 transform block, diagonal scan consisting of diagonal scan of four 4×4 sub-blocks and diagonal scan within each of the 4×4 sub-blocks of the 8×8 transform block, and applying the same multi-level significance map encoding to the 4×4 sub-blocks of the 8×8 transform block.

5. The method recited in claim 4, further comprising executing, as a condition that diagonal scan is applied to a 16×16 transform block, the diagonal scan consisting of diagonal scan of sixteen 4×4 sub-blocks and diagonal scan within each of the 4×4 sub-blocks of the 16×16 transform block to apply the same multi-level significance map encoding to the 4×4 sub-blocks of the 16×16 transform block.

6. The method recited in claim 4, further comprising executing, as a condition that diagonal scan is applied to a 32×32 transform block, the diagonal scan consisting of diagonal scan of sixty four 4×4 sub-blocks and diagonal scan within each of the 4×4 sub-blocks of the 32×32 transform block to apply the same multi-level significance map encoding to the 4×4 sub-blocks of the 32×32 transform block.

* * * * *